United States Patent
Bao et al.

(10) Patent No.: US 6,526,110 B1
(45) Date of Patent: Feb. 25, 2003

(54) EMBEDDED RAM BASED DIGITAL SIGNAL PROCESSOR

(75) Inventors: Jay Bao, Bridgewater, NJ (US); Tommy C. Poon, Murray Hill, NJ (US)

(73) Assignee: Mitsubishi Electric Research Laboratories Inc., Cambridge, MA (US)

( * ) Notice: Subject to any disclaimer, the term of this patent is extended or adjusted under 35 U.S.C. 154(b) by 0 days.

(21) Appl. No.: 09/395,700

(22) Filed: Sep. 14, 1999

(51) Int. Cl.[7] .............................. H04L 25/40
(52) U.S. Cl. ...................... 375/372; 375/324
(58) Field of Search ................ 375/372, 316, 375/324, 326; 712/225, 20, 21, 28, 32; 711/118, 3, 1, 149

(56) References Cited

U.S. PATENT DOCUMENTS

| | | | | |
|---|---|---|---|---|
| 6,041,400 A | * | 3/2000 | Ozcelik et al. | 712/35 |
| 6,141,740 A | * | 10/2000 | Mahalingaiah et al. | 711/215 |
| 6,226,738 B1 | * | 5/2001 | Dowling | 712/225 |
| 6,295,598 B1 | * | 9/2001 | Bertoni et al. | 712/28 |
| 6,308,253 B1 | * | 10/2001 | Gadre et al. | 712/41 |
| 6,321,296 B1 | * | 11/2001 | Pescatore | 711/118 |

OTHER PUBLICATIONS

Jack E. Volder; "The Cordic Trigonometric Computing Technique"; IRE Transactions on Electronic Computers, Sep., 1959; pp. 330–334.

* cited by examiner

*Primary Examiner*—Chi Pham
*Assistant Examiner*—Emmanuel Bayard
(74) *Attorney, Agent, or Firm*—Dirk Brinkman; Andrew J. Curtin

(57) ABSTRACT

An apparatus receives and demodulates digital signals encoded in multiple formats. The apparatus includes multiple processor units and a memory embedded with the processor units, and a cache connected to each of the processor units. The cache for communicating between the plurality of processors. The embedded memory can include data and instruction memory. The processor units and memory are configured as a multi-mode receiver demodulator front-end capable of receiving digitally modulated signals in multiple formats, and demodulating the signals in real-time in response any one of the multiple formats.

13 Claims, 7 Drawing Sheets

EMBEDDED RAM BASED DIGITAL SIGNAL PROCESSOR

FIELD OF THE INVENTION

The invention relates generally to digital signal processing, and more particularly, to run-time configurable digital signal processors.

BACKGROUND OF THE INVENTION

The explosive growth in telecommunication and multimedia applications demands flexible, efficient, high performance digital signal processing (DSP) devices. Current digital signal processors have many limitations when used for signal processing in telecommunication applications.

First, both general purpose DSPs and application specific DSPs have to deal with limited memory bandwidth. Second, in terms of performance, instruction based programmable DSPs typically lag ASICs by 1 to 2 orders of magnitude. This is a significant gap, especially for increasing demand from multimedia applications for wireless and wire line media. On the other hand, fixed logic based ASICs are not suitable for configurable signal processing, in addition to the reliance on external memory, which is also bandwidth limited.

SUMMARY OF THE INVENTION

The invention provides an architecture for digital signal processors that is based on embedded RAM (eRAM) technology. The invention exploits the very wide memory bandwidth available in eRAM, and the high memory density to achieve very high performance in signal processing functions such as filtering, scaling, and other arithmetic operations. Multiplication-free digital signal processing is made possible by replacing multiplication with memory based shift and add operations. As another advantage, the DSP according to the invention is run-time reconfigurable. This enables configurable signal receivers such as software defined radio and television receivers, or software based wireless telephones. Because the majority of the signal processing functions are memory-based, the DSP according to the invention is ideal for implementing scalable signal processors.

More particularly, the invention provides an apparatus that receives and demodulates digital signals encoded in multiple formats. The apparatus includes multiple processor units and a memory embedded with the processor units, and a cache connected to each of the processor units. The cache communicates between the plurality of processors. The embedded memory can include data and instruction memory. The processor units and memory are configured as a multi-mode receiver demodulator front-end capable of receiving digitally modulated signals in multiple formats, and demodulating the signals in real-time in response any one of the multiple formats.

DETAILED DESCRIPTION OF THE PREFERRED EMBODIMENT

The invention provides an embedded RAM based processor architecture to receive and demodulate high speed digital signals encoded in multiple formats. As an advantage, the processors can be reconfigured to decoded in response to the format of the signal that is being received. The embedded RAM has a wider memory bandwidth so that a cache can be implemented for each data processing unit (PU). This facilitates inter-PU communication and synchronization. In addition, multiplying and division operations are replaced by a CORDIC algorithm that contains shift and add operations implemented in memories. This reduces the load on the logic, and makes arithmetic operations easier to reconfigure.

Figure 1:
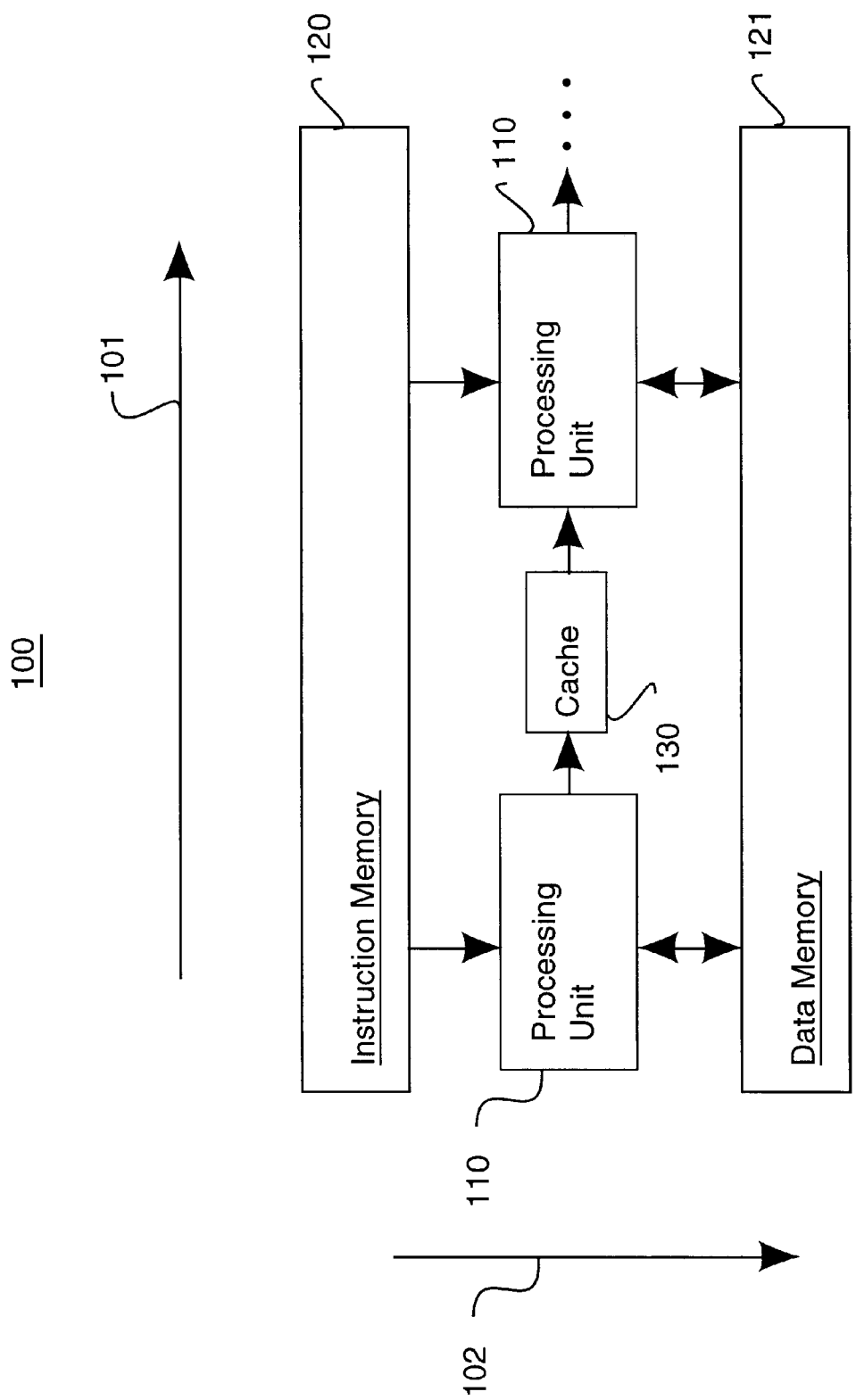
FIG. 1 is a block diagram of an embedded RAM based processor according to the invention.

FIG. 1 shows an embedded RAM (eRAM) based DSP 100 according to the invention. The DSP 100 includes a number of processing units (PU) 110, two banks of RAM 120–121, and cache memories 130 coupled to the processing units. This configuration is extendable horizontally 101 as well as vertically 102 to perform various calculation functions.

Each PU 110 performs arithmetic calculations on the data, such as filtering, decimation, interpolation. The RAMs 120–121 respectively store the instructions and data used by the PUs. The cache 130 can be configured as dual-port RAM, FIFO, or as product-term logic. Synchronization of multi-PU's can be achieved either using FIFOs, double buffers, and the like stored in the data RAM 121.

The processor units with embedded RAM can be the M32R/D -microcontroller that is available from Mitsubishi Electric Corporation. The M32R/D includes 2 MBytes of DRAM. For details, see the "M32000D4AFP User's Manual," available through the Mitsubishi Semiconductor Web site at "www.mitsubishichips.com." The M32R/D is fabricated using a process that is a hybrid between the logic process and the memory process. Alternatively, the 3DRAM Frame Buffer Memory, also from Mitsubishi Electric Corporation, can be used, see the "M5M410092 Specification, Rev 3.11," published by the Mitsubishi Electric Electronic Device Group. The 3DRAM executes read-modify-write operations on the memory chip itself to accelerate computations.

Figure 2:
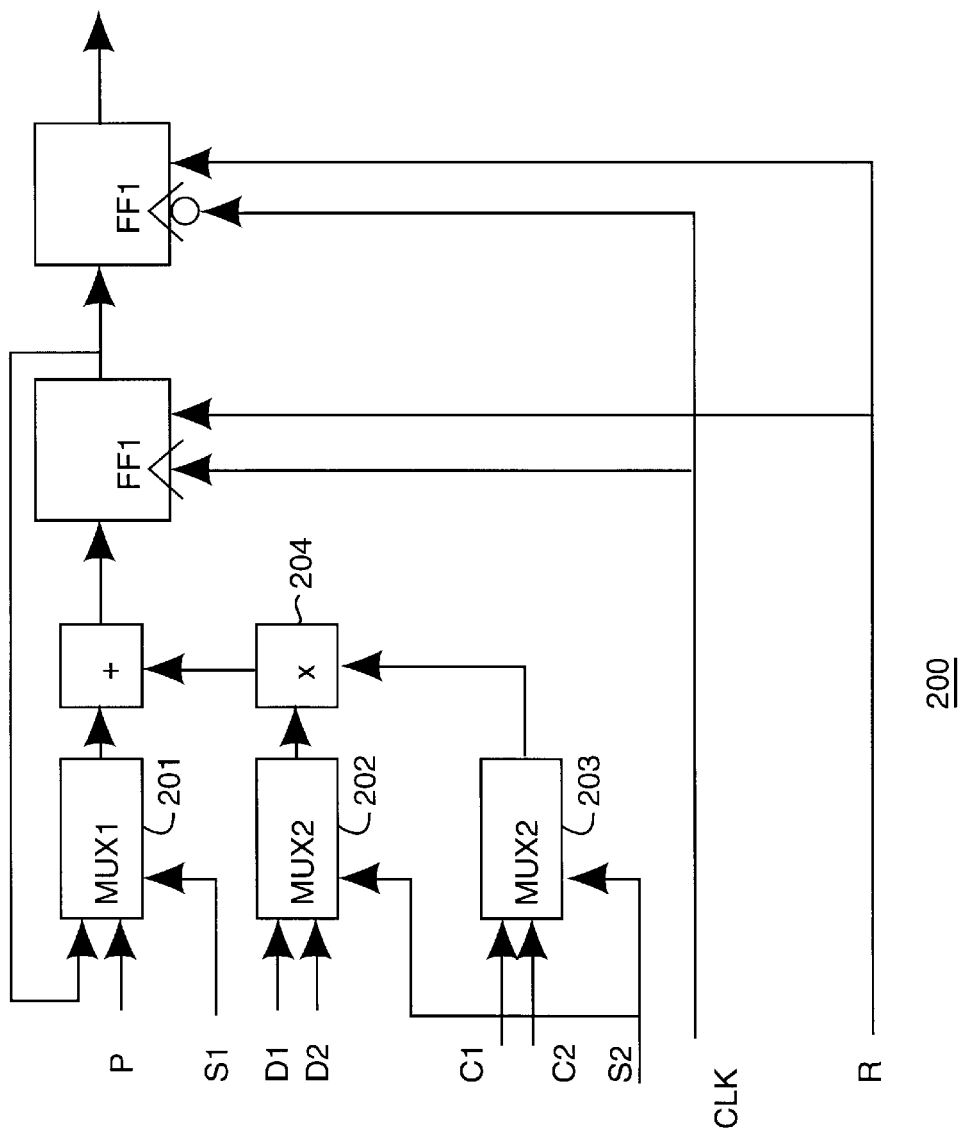
FIG. 2 is a block diagram of a processor core implemented using the eRAM based processor of FIG. 1.

In one embodiment of the invention shown in FIG. 2, the PU is a processing core 200 as described in U.S. patent application Ser. No. 09/288,097, entitled "Multiple Function Processing Core for Communication Signals," filed by Bao on Apr. 7, 1999, incorporated herein by reference. In this embodiment, the instruction memory stores the information used to control the configuration of multiplexers 201–203 in the processing core, and the data memory stores the data to be processed by the cores. The DSP can be configured to form programmable modems complied with various standards for digital audio, video, and data communications, as described in U.S. Pat. No. 5,940,438 entitled."Universal Modem for Digital Video, Audio and Data Communications," issued to Poon et al. on Aug. 17, 1999, incorporated herein by reference.

Figure 3:
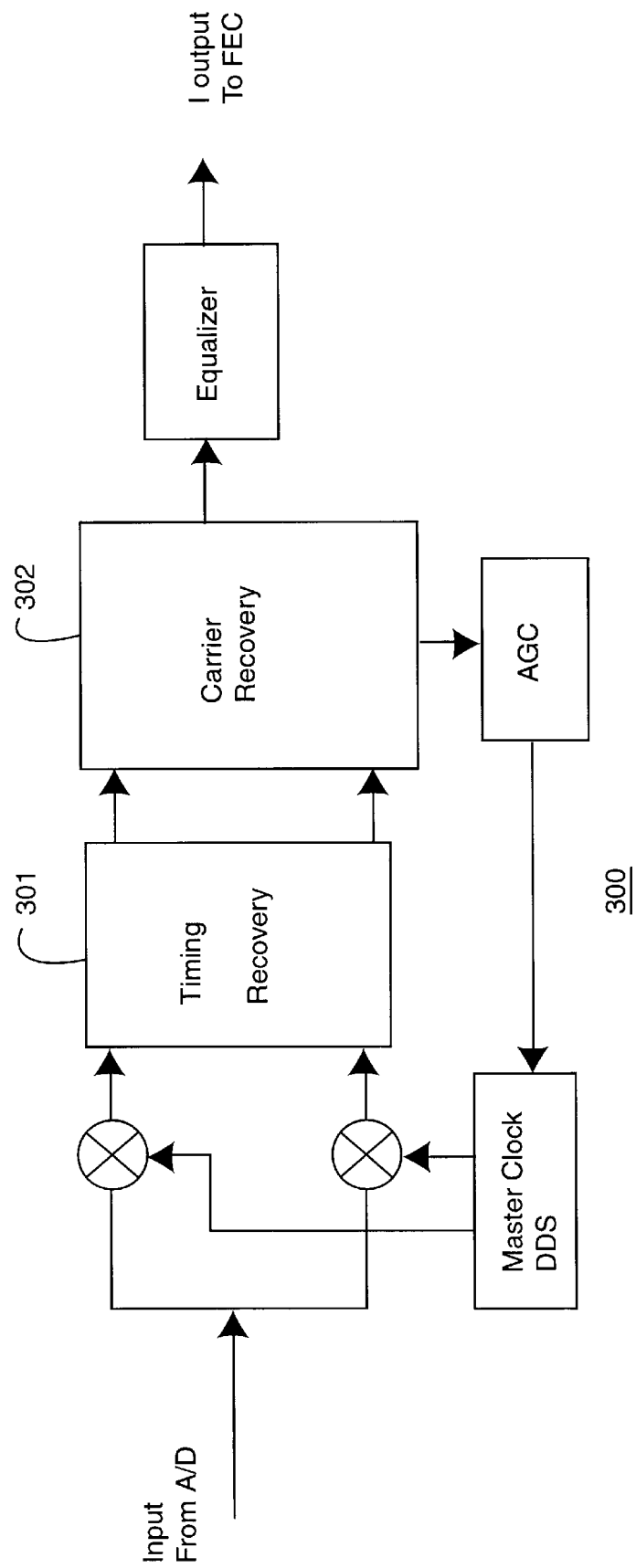
FIG. 3 is a block diagram of a recovery circuit implemented using the eRAM based processor of FIG. 1.

Alternatively, in another embodiment as shown in FIG. 3, each PU is custom designed to perform a specific function block in a system. For example, the blocks 300 implement a multi-mode receiver demodulator front-end capable of receiving digitally modulated signals in QAM, QPSK, and 8VSB format. The common blocks such as the interpolator, carrier recovery, equalizer, and the master clock module can each be implemented in one of the PUs, or a cluster of PU's.

In order to utilize the dense memory available in the eRAM 120–121, the multiplication operations in the timing and carrier recovery blocks 301–302 are implemented using only shift and add operations. The precision of the multiplication can be 16- or 32- bit, or defined by the user. This results in a multiplication-free DSP.

Figure 4A:
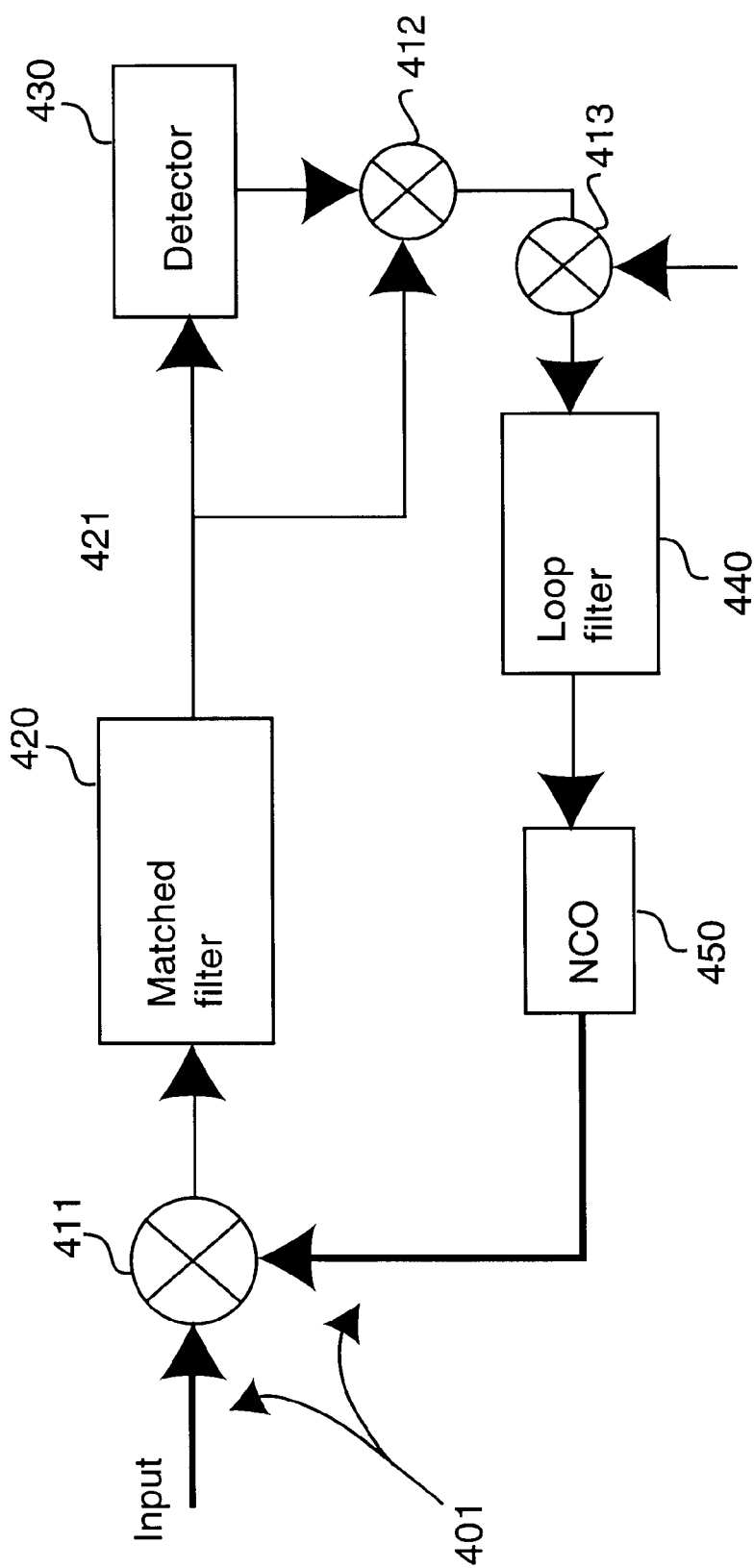
FIG. 4a is a block diagram of a circuit for computing phase angle errors implemented using the eRAM based processor of FIG. 1.

FIG. 4*a* shows a carrier recovery block 400. The carrier recovery block includes three multipliers 411–413, a matched filter 420, a detector 30, a loop filter 440, and a numerically controlled oscillator (NCO) 450. The signals on lines 401 are complex values with a real part I, and an imaginary part Q.

Figure 4B:
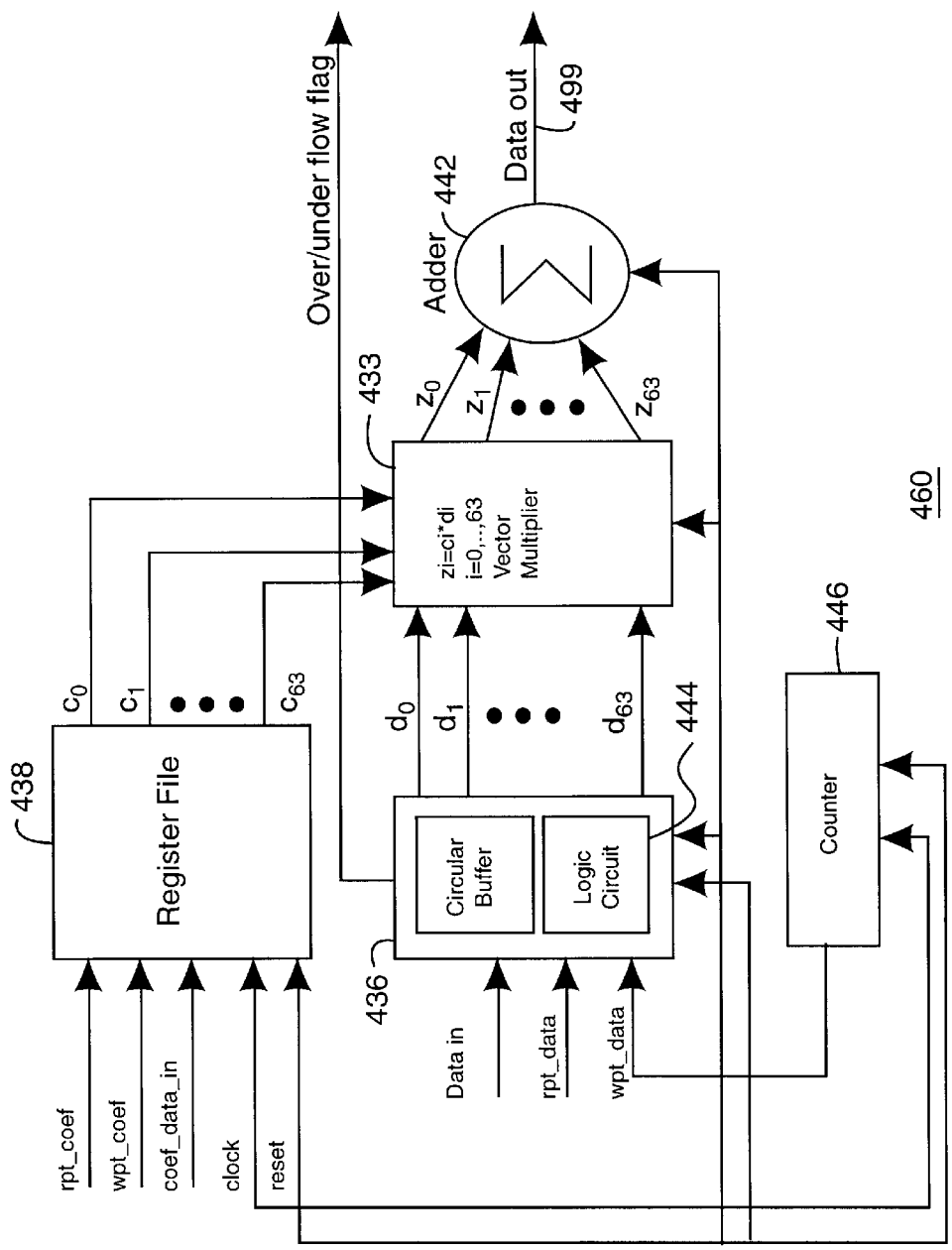
FIG. 4b is a block diagram of a signal interpolator.

FIG. 4*b* shows an interpolator 460 of a timing recovery block. The interpolator provides interpolants at time intervals $T_i$. The interpolator includes circular buffer registers 436 for storing and supplying data samples, a register file 438 for storing interpolator coefficients ($c_o, \ldots, c_{63}$) for the illustrated 64 tap interpolator filter, a vector multiplier 433 for appropriately combining data signals ($d_o, \ldots, d_{63}$) with the filter coefficients to produce data signals ($z_o, \ldots, Z_{63}$), and adder 442 for combining the data signals as a Data out signal 499, and a logic module 444 under control of a counter 446 to provide necessary control functions.

Figure 5:
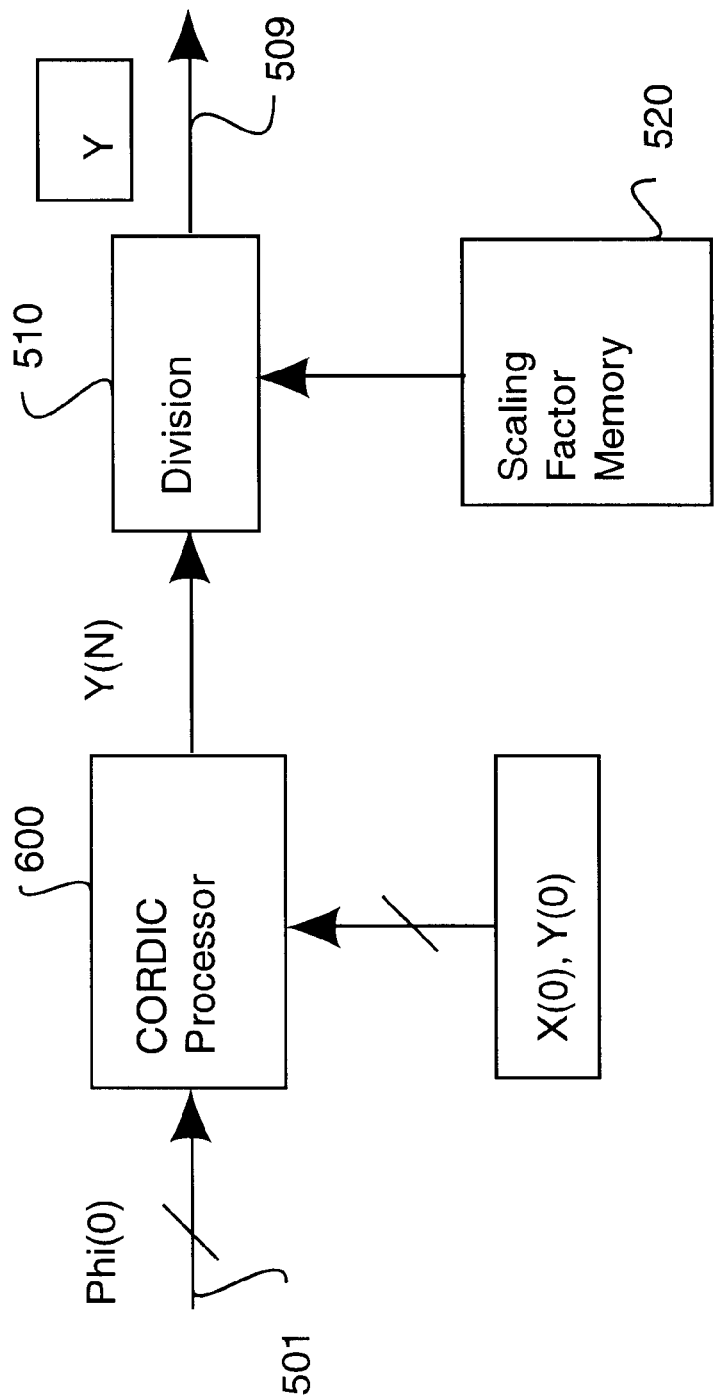
FIG. 5 is a block diagram of a CORDIC structure implemented using the eRAM based processor of FIG. 1.

As shown in FIG. 5, phase angle errors 509, required for the carrier recovery loops, are calculated as a complex product between the input signal 501 and the conjugate of the output level of the I-Q detector 430 of FIG. 4. Typically, this product is then scaled 510, which involves division and product using scaling factors 520 stored in the data memory 121. The division operation can be achieved by either of the two PU structures previously described. When implemented using PU structures based on memory, division is accomplished by shifting a value (Y(N)) by the scaling factor 520, and rewriting the result to a new memory location. When implemented using a PU structure that is based on the processor core of FIG. 2, the multiplier-204 in the core is used to compute the result. This phase error calculation, as well as the heterodyne operation which involves a complex multiplication of the input signal with a sinusoid output from the NCO 450, can be implemented in a multiplier-less fashion using a CORDIC processor 600. The scaling factors can be updated as needed.

Figure 6:
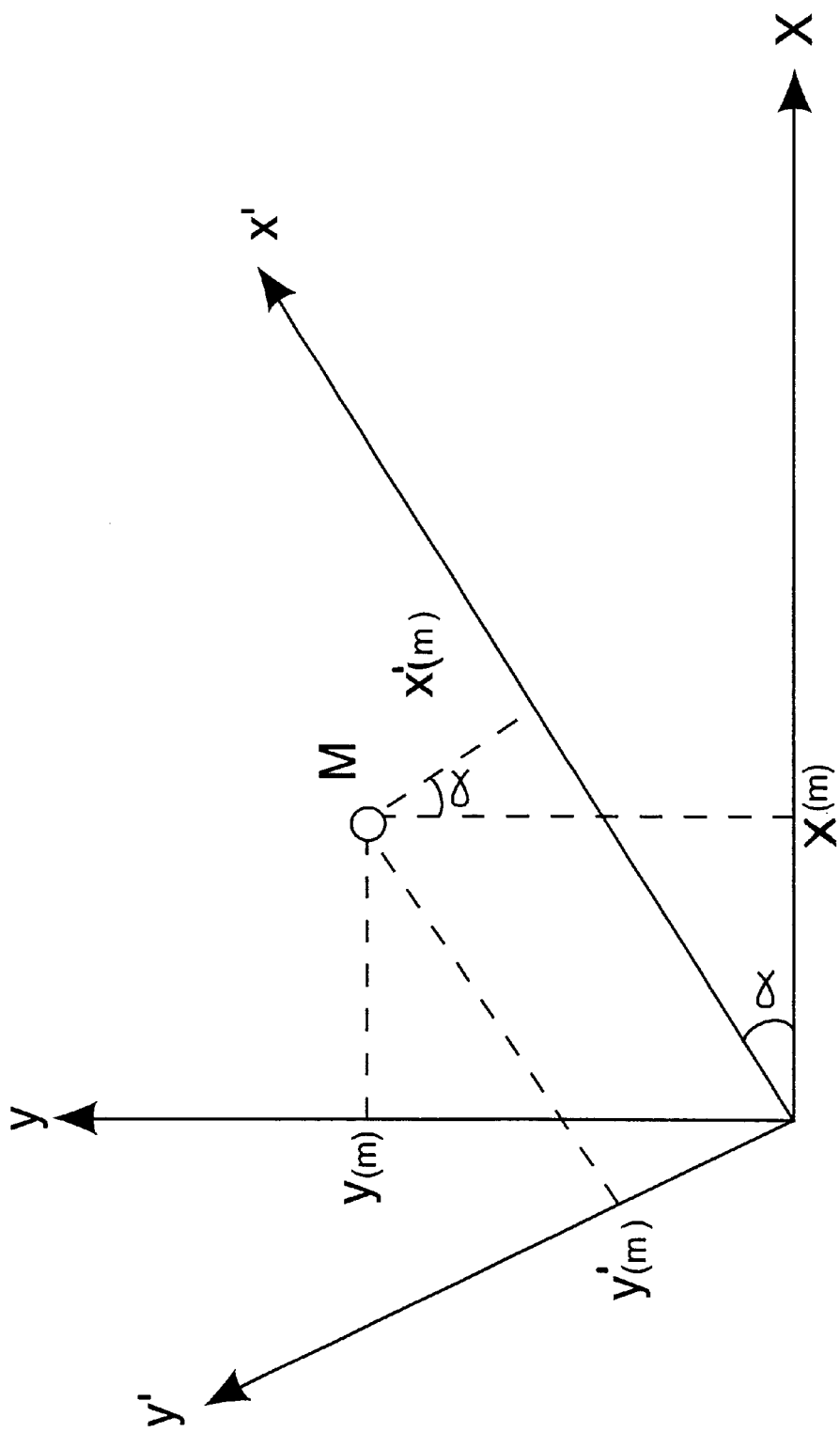
FIG. 6 is a graph of coordinate rotation by the CORDIC structure.

The CORDIC processor is described by Volder, in "The CORDIC Trigonometric Computing Technique," IRE Transactions on Electronic Computers, V. EC-8, No. 3, pp. 330–334, 1959. The CORDIC processor is a coordinate rotation device. A CORDIC algorithm performs vector coordinate rotations, as shown in FIG. 6, by using simple iterative shifts and add/subtract operations on the coordinates x(m) and y(m) of point M to derive rotated coordinates x(m') and y(m').

The problem is to determine X and Y given X(0) and Y(0). Using trigonometric computing:

$X = X(0) \cos \alpha + Y(0) \sin \alpha$ $Y = Y(0) \cos \alpha - X(0) \sin \alpha$ where α is the rotation angle after N CORDIC iterations. The operations in CORDIC processor involve only additions and subtractions. Division is performed by shifting the bits using the scaling factor memory 520. The CORDIC processor is implemented with adders with bit-width defined by the user, the scaling factor and the output of the CORDIC processor are stored in the data memory 120.

The same CORDIC structure can also be used for the timing recovery block 301, which includes similar phase locked circuits involves heterodyne and complex multiplication operations as described in U.S. patent application Ser. No. 08/997,772, entitled "Data Receiver Having Variable Rate Symbol Timing Recovery with Non-Synchronized Sampling" filed by Lu at al. on Dec. 24, 1997, incorporated herein by reference. Therefore, the Cordic processor as described above can replace the vector multiplication 433 of FIG. 4*b*.

Compared with conventional programmable DSPs and similar CODRIC implementations, the DSP according to the invention has a gain in speed that is greater than a factor of ten. For conventional DSPs, the latency is even greater when standard multipliers are used.

Compared with ASICs, the speed is similar to a full ASIC implementation of the CORDIC. However, due to the wider memory bus width (64-bit or more), and thus easier access to memories at high speed, the eRAM based approach as described herein outperforms ASIC solutions for higher precision applications. The power consumption of the eRAM based DSP 100 is similar to ASICs, but less than programmable DSP.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. An apparatus for receiving and demodulating digital signals encoded in multiple formats; comprising:

a plurality of processor units;

a memory embedded with the plurality of processor units and connected to the plurality of processor units; and a cache connected to each of the plurality of processor units, the cache for communicating between the plurality of processors, and wherein the processor units and memory are configured as a multi-mode receiver demodulator front-end capable of receiving digitally modulated signals in multiple formats, and further demodulating the signals in real-time in response any one of the multiple formats.

2. The apparatus of claim 1 wherein the memory includes a data memory and an instruction memory.

3. The apparatus of claim 1 wherein the memory and the plurality of processor unit s are constructed on a single semiconductor chip.

4. The apparatus of claim 1 wherein the cache is configured as a dual-ported RAM.

5. The apparatus of claim 1 wherein the cache is configured as a first-in-first-out buffer.

6. The apparatus of claim 1 wherein the processor and memory are configured to form a coordinate rotation processing function block and are used to perform heterodyne and complex multiplication in a timing recovery block including an interpolator and a carrier recovery block.

7. The apparatus of claim 1 wherein the multiple formats include QAM, QPSK, 8PSK, and 8VSB formats.

8. The apparatus of claim 1 wherein the multiple formats include carrierless amplitude-phase modulation.

9. The apparatus of claim 1 wherein the front end interpolates, recovers a carrier, equalizes, and generates master clock signals.

10. The apparatus of claim 1 wherein phase angle errors are computed using only add and shift operations.

11. The apparatus of claim 1 wherein timing and carrier signals are recovered.

12. The apparatus of claim 1 wherein the multiple formats include coded orthogonal frequency division multiplexing.

13. The apparatus of claim 1 wherein the multiple formats are software reconfigured to adapt to different formats while receiving and demodulating the digital signals.

* * * * *